(12) United States Patent
Webster et al.

(10) Patent No.: US 7,076,775 B2
(45) Date of Patent: Jul. 11, 2006

(54) POWER EFFICIENCY IN MICROPROCESSOR SYSTEMS

(75) Inventors: Paul Webster, Cambridge (GB); Phil Endecott, Cambridge (GB)

(73) Assignee: AT&T Laboratories Cambridge Ltd., Cambridge (GB)

(*) Notice: Subject to any disclaimer, the term of this patent is extended or adjusted under 35 U.S.C. 154(b) by 525 days.

(21) Appl. No.: 10/206,168

(22) Filed: Jul. 26, 2002
(Under 37 CFR 1.47)

(65) Prior Publication Data
US 2003/0212914 A1    Nov. 13, 2003

(30) Foreign Application Priority Data
Jul. 28, 2001    (GB) ................. 0118420.9

(51) Int. Cl.
*G06F 9/45*    (2006.01)

(52) U.S. Cl. ................... 717/159; 713/320

(58) Field of Classification Search ............. 717/161; 713/320
See application file for complete search history.

(56) References Cited

U.S. PATENT DOCUMENTS

| | | | |
|---|---|---|---|
| 5,790,874 A |  | 8/1998 | Takano et al. |
| 5,819,088 A | * | 10/1998 | Reinders ................. 717/149 |
| 5,835,776 A | * | 11/1998 | Tirumalai et al. ........... 717/161 |
| 5,894,576 A | * | 4/1999 | Bharadwaj ................. 717/156 |
| 6,002,878 A | * | 12/1999 | Gehman et al. ............ 713/340 |
| 6,535,984 B1 | * | 3/2003 | Hurd ..................... 713/320 |
| 6,587,939 B1 | * | 7/2003 | Takano ................... 712/210 |
| 6,725,450 B1 | * | 4/2004 | Takayama ................. 717/139 |

FOREIGN PATENT DOCUMENTS

| | | | |
|---|---|---|---|
| EP | 0 520 650 | | 6/1992 |
| JP | 8-106384 | | 4/1996 |
| JP | 8101773 | * | 4/1996 |
| JP | 8101777 | * | 4/1996 |
| WO | WO 02095574 A1 | * | 11/2002 |

OTHER PUBLICATIONS

Fujino, Mitsumasa; Moshnyaga, Vasily, "An Efficient Hamming Distance Comparator for Low-Power Applications", p. 641-644, 2002 IEEE, retrieved Jul. 12, 2005.*
Lee, Chingren; Lee, Jenq Kuen; Hwang, TingTing; Tsai, Shi-Chun; "Compiler Optimization on Instruction Scheduling for Low Power", p. 55-60, Sep. 2000, Proceedings of the 13th International Symposium on System Synthesis, ACM, retrieved Jul. 12, 2005.*
Ishihara, Tohru; Yasuura, Hiroto; "A Power Reduction Technique with Object Code Merging for Application Specific Embedded Processors", p. 617-623, Jan. 2000, Proceedings of the conference on Design, automation & test in Europe, ACM, retrieved Jul. 12, 2005.*
Tomiyama, Hiroyuki; Ishihara, Tohru; Knoue, Akihiko; Yasuura, Hiroto; "Instruction Scheduling for Power Reduction in Processor-Based System Design", p. 855-860, 1998 IEEE, retireved Jul. 12, 2005.*
Search Report regarding corresponding Great Britain Application No. 0118420.9 dated Mar. 14, 2002.

* cited by examiner

*Primary Examiner*—Wei Y. Zhen
*Assistant Examiner*—Mary Steelman
(74) *Attorney, Agent, or Firm*—Renner, Otto, Boisselle & Sklar, LLP

(57) ABSTRACT

Methods of reducing the power consumption of a microprocessor system, comprising a microprocessor and memory connected by a bus, are provided which involve optimising a program stored in the memory by rescheduling after linking, swapping equivalent instructions, or swapping the operands of commutative operations.

6 Claims, No Drawings

POWER EFFICIENCY IN MICROPROCESSOR SYSTEMS

TECHNICAL FIELD

The invention relates to the reduction of power consumption in a microprocessor system, which comprises a microprocessor and a memory connected by at least one bus.

BACKGROUND

The methods described in this specification aim to improve a processor's average inter-instruction Hamming distance. The next few paragraphs describe this metric and explain its relation to power efficiency.

The Hamming distance between two binary numbers is the count of the number of bits that differ between them. For example:

| Numbers in decimal | Numbers in binary (inc. leading zeros) | Hamming distance |
| --- | --- | --- |
| 4 and 5 | 0100 and 0101 | 1 |
| 7 and 10 | 0111 and 1010 | 3 |
| 0 and 15 | 0000 and 1111 | 4 |

Hamming distance is related to power efficiency because of the way that binary numbers are represented by electrical signals. Typically a steady low voltage on a wire represents a binary 0 bit and a steady high voltage represents a binary 1 bit. A number will be represented using these voltage levels on a group of wires, with one wire per bit. Such a group of wires is called a bus. Energy is used when the voltage on a wire is changed. The amount of energy depends on the magnitude of the voltage change and the capacitance of the wire. The capacitance depends to a large extent on the physical dimensions of the wire. So when the value represented by a bus changes, the energy consumed depends on the number of bits that have changed—the Hamming distance—between the old and new values, and on the capacitance of the wires.

If one can reduce the average Hamming distance between successive values on a high-capacitance bus, keeping all other aspects of the system the same, the system's power efficiency will have been increased.

The capacitance of wires internal to an integrated circuit is small compared to the capacitance of wires fabricated on a printed circuit board due to the larger physical dimensions of the latter. The kind of systems that we are considering will normally have memory and microprocessor in distinct integrated circuits, interconnected by a printed circuit board. Therefore we aim to reduce the average Hamming distance between successive values on the microprocessor-memory interface bus, as this will have a particularly significant influence on power efficiency.

Even in systems where microprocessor and memory are incorporated into the same integrated circuit the capacitance of the wires connecting them will be larger than average, so even in this case reduction of average Hamming distance on the microprocessor-memory interface is worthwhile.

Processor-memory communications perform two tasks. Firstly, the processor fetches its program from the memory, one instruction at a time. Secondly, the data that the program is operating on is transferred back and forth. The instruction fetch makes up the majority of the processor-memory communications.

The instruction fetch bus is the bus on which instructions are communicated from the memory to the processor. We aim to reduce the average Hamming distance on this bus, i.e. to reduce the average Hamming distance from one instruction to the next.

Instruction formats will now be discussed.

A category of processors which is suitable for implementation of the invention is the category of RISC (Reduced Instruction Set Computer) processors. One defining characteristic of this category of processors is that they have regular, fixed-size instructions. In our processor all instructions are made up of 32 bits. This is the same as the size of the instruction fetch bus.

Each instruction needs to convey various items of information to the processor. These items include:

Operation codes (opcodes) indicating which basic action, such as addition, subtraction, etc. the processor should carry out.

Register specifiers, indicating which of the processor's internal storage locations (registers) should supply operands to or receive results from the operation.

Values that are used directly as operands to the function called immediate values.

For example, an instruction that tells the processor to "add 10 to the value currently in register 4 and store the result in register 5" would have the opcode for 'add', register specifiers 4 and 5, and immediate value 10.

We consider a processor with an instruction set which has only three instruction formats. The first has a five-bit opcode and a 26-bit immediate value. The second has a five-bit opcode, two five-bit register specifiers, and a 16-bit immediate value. The third has a five-bit opcode, six bit secondary opcode and three five-bit register specifiers. The fields that are common to all of the different instruction formats, such as the primary opcode field, are arranged to always be in the same bit positions:

| 31 | . | . | . | . | . | . | . | . | . | . | . | . | . | . | . | . | . | . | . | . | . | . | . | . | . | . | . | . | . | . | 0 |
|---|---|---|---|---|---|---|---|---|---|---|---|---|---|---|---|---|---|---|---|---|---|---|---|---|---|---|---|---|---|---|---|

| X | <Primary Opcode> | <Immediate26> | | | | | | |
| --- | --- | --- | --- | --- | --- | --- | --- | --- |
| X | <Primary Opcode> | <Reg1> | <Reg2> | <Immediate16> | | | | |
| X | <Primary Opcode> | <Reg1> | <Reg2> | X X X X X | <Secondary Opcode> | <Reg3> | | |

Instruction scheduling will now be discussed.

Instruction scheduling is a known technique in which the order of the instructions is permuted in order to improve performance. Such modifications change the order in which instructions are executed, but do not modify the overall behaviour of the instruction sequence. To ensure this, any modification to the order of instructions must take into account the dependencies between instructions. In a traditional instruction scheduler, the goal is to avoid contention for CPU resources.

For example, consider the following C code fragment:

```
    int foo(int *array1, int *array2, int size) {
1       int loop, result;
2       result= 0;
3       for (loop= 0; loop<size; loop++) {
4           result= result + (*(array1++)* *(array2++));
        }
5       return result;
    }
```

This compiles into the assembly language shown over the page. While we have chosen to illustrate the techniques using our own processor instruction set, the techniques apply equally well to any other similar 3-operand processor.

A short line has been used to separate the basic blocks that make up the program. Basic blocks are sections of the code that end with a change in program flow (a branch or call instruction). A new basic block is also started by a labelled instruction.

Next to the assembly language, we have shown the bit patterns representing the instructions. Any unused (or unallocated) bits have been shown as an 'X'. The processor ignores these bits when it is decoding the operation described by an instruction. It is possible to optimise these bits to further reduce the Hamming distance, as we have described in a separate patent application. Such an optimisation should ideally be carried out in parallel with the optimisations described in this document.

In the bit patterns, any unresolved immediate fields are marked with an 'i'. These are immediate values which are specified using a symbolic reference whose actual value is defined externally to the current compilation unit and therefore cannot be resolved into an actual value until the final link stage has taken place.

The final column shows the Hamming distance between the previous instruction and the current one. For the sake of simplicity, the unused bits are ignored when performing this calculation.

1

| | | | | |
|---|---|---|---|---|
| 1 | addi | % sp, % sp, #-20 | x00100.11110.11110.1111111111101100 | |
| 2 | st.w | 0(% sp), %8 | x.10101.11110.01000.0000000000000000 | 18 |
| 3 | st.w | 4(% sp), %9 | x.10101.11110.01001.0000000000000100 | 2 |
| 4 | st.w | 8(% sp), %10 | x.10101.11110.01010.0000000000001000 | 4 |
| 5 | st.w | 12(% sp), %11 | x.10101.11110.01011.0000000000001100 | 2 |
| 6 | st.w | 16(% sp), %1r | x.10101.11110.11111.0000000000010000 | 5 |
| 7 | ori | %10, %0, #0 | x.01100.00000.01010.0000000000000000 | 11 |
| 8 | ori | %9, %1, #0 | x.01100.00001.01001.0000000000000000 | 3 |
| 9 | movi | %11, #0 | x.00010.xxxxx.01011.0000000000000000 | 4 |
| 10 | cmplt | %7, %11, %2 | x.00000.01011.00010.xxxxx.000110.00111 | 8 |
| 11 | bz | %7, L4 | x.11010.00111.xxxxx.iiiiiiiiiiiiiii | 5 |

2

| | | | | |
|---|---|---|---|---|
| 12 | ori | %8, %2, #0 | x.01100.00010.01000.0000000000000000 | 5 |

3

| | | | | |
|---|---|---|---|---|
| 13 L6: | ld.w | %0, (%10) | x.10100.01010.00000.0000000000000000 | 3 |
| 14 | ld.w | %1, (%9) | x.10100.01001.00001.0000000000000000 | 3 |
| 15 | call | __mulsi3 | x.11111.iiiiiiiiiiiiiiiiiiiiiiiii | 3 |

4

| | | | | |
|---|---|---|---|---|
| 16 | add | %11, %11, %0 | x.00000.01011.00000.xxxxx.000000.01011 | 5 |
| 17 | addi | %9, %9, #4 | x.00100.01001.01001.0000000000000100 | 8 |
| 18 | addi | %10, %10, #4 | x.00100.01010.01010.0000000000000100 | 4 |
| 19 | addi | %8, %8, #-1 | x.00100.01000.01000.1111111111111111 | 17 |
| 20 | bnz | %8, L6 | x.11011.01000.xxxxx.iiiiiiiiiiiiiii | 5 |

5

| | | | | |
|---|---|---|---|---|
| 21 L4: | ori | %0, %11, #0 | x.01100.01011.00000.0000000000000000 | 6 |
| 22 | ld.w | %8, 0(% sp) | x.10100.11110.01000.0000000000000000 | 5 |
| 23 | ld.w | %9, 4(% sp) | x.10100.11110.01001.0000000000000100 | 2 |
| 24 | ld.w | %10, 8(% sp) | x.10100.11110.01010.0000000000001000 | 4 |
| 25 | ld.w | %11, 12(% sp) | x.10100.11110.01011.0000000000001100 | 2 |
| 26 | ld.w | %1r, 16(% sp) | x.10100.11110.11111.0000000000010000 | 5 |
| 27 | addi | % sp, % sp, #20 | x.00100.11110.11110.0000000000010100 | 3 |
| 28 | jmpr | (%1r) | x.00000.11111.xxxxx.xxxxx.011110.xxxxx | 6 |

Total: 148 transitions

When scheduling this code, no instructions can move outside of their original basic block. In addition, the following dependencies must be preserved:

| Basic Block #1 | | | |
|---|---|---|---|
| #1 | before | #2, #3, #4, #5, #6 | Dependency on % sp |
| #4 | before | #7 | Dependency on %10 |
| #3 | before | #8 | Dependency on %9 |
| #5 | before | #9 | Dependency on %11 |
| #10 | before | #11 | Dependency on %7 |
| #11 | after | #1 to #10 | |

| Basic Block #4 | | | |
|---|---|---|---|
| #19 | before | #20 | Dependency on %8 |
| #20 | ater | #16 to #19 | |

| Basic Block #5 | | | |
|---|---|---|---|
| #21 | before | #25 | Dependency on %11 |
| #22, #23, #24, #25, #26 | before | #27 | Dependency on % sp |
| #28 | after | #21 to #27 | |

To explain how to interpret these tables, consider instructions #1 to #7. From the table, we can see that instruction #1 modifies the stack pointer (% sp), which is subsequently used in instructions #2 to #6. Therefore, this instruction must always precede the other instructions. Instruction #7 updates register % 10, so must be scheduled after the old value has been saved. This is achieved in instruction #4.

Any order of the instructions that respects these dependencies will have the same behaviour as the original code. We aim to find an order with the minimum overall Hamming distance. For example, one possible choice is:

| | | |  | |
|---|---|---|---|---|
| addi | % sp, % sp, #-20 | X.00100.11110.11110.1111111111101100 | | |
| st.w | 16(% sp), %1r | X.10101.11110.11111.0000000000010000 | 17 | |
| st.w | 0(% sp), %8 | X.10101.11110.01000.0000000000000000 | 5 | |
| st.w | 4(% sp), %9 | X.10101.11110.01001.0000000000000100 | 2 | |
| st.w | 12(% sp), %11 | X.10101.11110.01011.0000000000001100 | 2 | |
| st.w | 8(% sp), %10 | X.10101.11110.01010.0000000000001000 | 2 | |
| mov | %10, %0 | X.01100.00000.01010.0000000000000000 | 8 | |

The function of this code has not changed, but the total Hamming distance has been reduced from 42 down to 36 (a 15% saving). There is no reduction in code performance as a result of this alternative scheduling.

Any of the existing code scheduling algorithms can be adapted to perform this task. Instead of maximising functional unit usage, the 'cost' function is modified to be the Hamming distance to the neighbouring instructions.

One such algorithm to perform this task is as follows:
1. Split the code into 'basic blocks' (code which does not contain a change in execution path, or begins with a label).
2. For each basic block in turn, create a set of all the instructions that are contained in that basic block. This is the block set, B.
3. Determine the dependencies between the instructions in B.
4. Find a set of candidate instructions, C, from the instructions in B that are the instructions from B that do not depend on any other instruction in B. These are the instructions that could be scheduled next without changing the behaviour of the application.
5. Select the instruction from C that has the smallest Hamming distance from the previously output instruction (which may actually be in the previous basic block). Output this instruction and remove it from B.
6. Repeat from stage 3 until B is empty.
7. Repeat from stage 2 until all of the basic blocks have been processed.

To illustrate a problem with this algorithm, consider the following pseudo-code:

| | |
|---|---|
| L1: | instruction #1 |
| | instruction #2 |
| | instruction #3 |
| | branch L1 |
| | instruction #4 |

The choice of instruction #4 is made on the basis of the branch instruction. Similarly, the choice of instruction #2 is made on the basis of instruction #1. This fails to take into account the dynamic behaviour of the code.

The difficulty arises when considering instruction #2. The simple algorithm described will choose instruction #2 based on instruction #1. But as we are dealing with a loop, it is more likely that instruction #2 will be fetched more frequently as a result of the backwards branch being taken. Therefore, it should be chosen so that it minimises the Hamming distance from the branch instruction.

For processors that have a branch shadow (one or more instructions that are fetched from the location(s) sequentially after a branch, even if the branch is executed) then instruction #2 should be chosen on the basis of the last instruction fetched in the shadow. For a single instruction shadow, this would be instruction #4.

We have described the known process of instruction scheduling. In the past, such rescheduling has been done at the compilation stage. However, from the point of view of reducing Hamming distance, this suffers from the disadvantage that at the compilation stage not all symbols have been fully resolved.

SUMMARY

The invention provides methods of reducing the power consumption of microprocessor systems by optimising programs, as set out in the accompanying claims.

The invention also provides computer programs and a reduced power microprocessor system as set out in the accompanying claims.

DETAILED DESCRIPTION

It is known to produce programs by compiling a number of component programs, and then linking these together in a separate operation. Unlike in previous work, scheduling may be performed after the final link has taken place. This means that symbols have been fully resolved, and so the values of all the immediate fields are available and can be taken into account when choosing from the candidate set. It is because of this factor that we prefer to refer to this as a code 'rescheduling'. In the previous code fragment, this would be of benefit to instructions #11, #15 and #20.

The invention allows the source register operands to be permuted in cases where doing so still produces functionally equivalent code.

An example of the code rescheduling features of the invention will now be described in greater detail.

In this example, the code rescheduling stage is extended so that in addition to changing the order of instructions, it can also change the instruction used to perform a particular operation. However, it will be appreciated that this aspect of the invention can be performed independently of code rescheduling.

For example, any of the following instructions will perform the common operation of moving a value from one register into another:

Add with an immediate value of 0
Logical OR with an immediate value of 0
Logical AND with the binary value with all bits set to 1
Exclusive OR with an immediate value of 0
Any shift by zero places
Logical AND of a register with itself
Logical OR of a register with itself Depending on the neighbouring instructions, the instruction bit pattern with the smallest Hamming distance should be chosen. Once again, this will reduce the number of transitions without affecting the functionality of the program or the overall performance.

In the example shown previously, to move the contents of one register to another one, we have used an OR of the source register with an immediate value of zero. This occurs, for example in instructions #12 and #21. These instructions can be modified to replace the immediate OR operation with a functionally equivalent immediate XOR operation. This results in the following changes:

| Instruction 12: | | | |
|---|---|---|---|
| bz | %7, L4 | x.11010.00111.xxxxx.oooooooooooooooo | |
| ori | %8, %2, #0 | x.01100.00010.01000.0000000000000000 | 5 |
| Becomes: | | | |
| bz | %7, L4 | x.11010.00111.xxxxx.oooooooooooooooo | |
| xori | %8, %2, #0 | x.01110.00010.01000.0000000000000000 | 4 |

| Instruction 21: | | | |
|---|---|---|---|
| bnz | %8, L6 | x.11011.01000.xxxxx.oooooooooooooooo | |
| L4: ori | %0, %11, #0 | x.01100.01011.00000.0000000000000000 | 6 |
| Becomes | | | |
| bnz | %8, L6 | x.11011.01000.xxxxx.oooooooooooooooo | |
| L4: xori | %0, %11, #0 | x.01110.01011.00000.0000000000000000 | 5 |

In each of these cases, the Hamming distance has been reduced by one transition.

An example of the invention will now be described.

When an operation is commutative (that is, the result is the same regardless of the order of the source registers), then the rescheduling operation can swap the source register fields without affecting the overall function of the instruction. This can be used to arrange for register numbers to be aligned in the register fields of neighbouring instructions, and thereby reduce the number of transitions.

Such operations include:
Adding two registers together
Logical OR of one register with another
Logical Exclusive OR of one register with another
Equality comparisons between two registers
Multiplication of two registers It is also possible to swap source registers in other cases, but it may then require the operation of the instruction to be modified. For example, a 'less-than' comparison could have its source registers reversed, but would require the instruction to be changed to a 'greater-than' operation.

Consider the following code that could be generated by a compiler to select a field from an array of structures:

| | | | |
|---|---|---|---|
| add | %0, %1, %0 | x.00000.00001.00000.xxxxx.000100.00000 | |
| ld.w | %1, 4(%0) | x.10100.00000.00001.0000000000000100 | 6 |

If the source operands of the first add instruction are reversed, the function is identical, but the total Hamming distance is reduced by two transitions:

| | | | |
|---|---|---|---|
| add | %0, %0, %1 | x.00000.00000.00001.xxxxx.000100.00000 | |
| ld.w | %1, 4(%0) | x.10100.00000.00001.0000000000001000 | 4 |

What is claimed is:

1. A method of reducing the power consumption of a microprocessor system which comprises a microprocessor and a memory connected by at least one bus, said microprocessor being arranged to execute a program stored in said memory, said method comprising optimising said program by carrying out the following steps:
 a) identifying those instructions of said program which involve a commutative operation,
 b) for such instructions, considering the effect of swapping operands of said commutative operation on a Hamming distance between consecutive ones of said instructions, and
 c) selecting an order of said operands which results in a lowest overall Hamming distance when said program is executed, wherein "commutative operation" includes at least one operation which is commutative only if said operation is modified, and wherein the method further includes taking into account an effect on Hamming distance of modifying said operation, and both modifying said operation and changing the order of said operands if this results in a smaller Hamming distance.

2. A method of reducing the power consumption of a microprocessor system as claimed in claim 1,
said method further comprising optimising said program by carrying out the following steps:
 a) producing a number of component programs each comprising a series of source code instructions,
 b) compiling each said component program to produce a number of compiled programs,
 c) linking said compiled programs to produce a linked program which comprises a series of instructions containing fully resolved symbols, and
 d) producing said program by performing code rescheduling on said series of instructions, so as to change an order of said instructions in order to reduce a hamming distance between consecutive ones of said instructions.

3. A method of reducing the power consumption of a microprocessor system as claimed in claim 1, said method further comprising optimising said program by carrying out the following steps:
  a) for each instruction of said program, considering possible alternative instructions which could be substituted for said instruction without changing an operation of said program,
  b) for each such possible alternative instruction, considering how a use of said alternative instruction would affect a hamming distance between consecutive instructions, and
  c) selecting said instruction which results in a lowest overall hamming distance when said program is executed.

4. A method a claimed in claim 1, wherein said at least one operation is one of a "less-than" and a "greater-than" operation.

5. A program stored on a machine readable medium for reducing the power consumption of a microprocessor system, said program having been optimised by carrying out said optimisation steps of claim 1.

6. A reduced power microprocessor system comprising a microprocessor and a memory connected by at least one bus, wherein said memory contains a program for execution by said microprocessor, the program having been optimized by carrying out optimization steps as follows:
  a) identifying those instructions of said program which involve a commutative operation,
  b) for such instructions, considering the effect of swapping operands of said commutative operation on a Hamming distance between consecutive ones of said instructions, and
  c) selecting an order of said operands which results in a lowest overall Hamming distance when said program is executed, wherein "commutative operation" includes at least one operation which is commutative only if said operation is modified, and wherein the method further includes taking into account an effect on Hamming distance of modifying said operation, and both modifying said operation and changing the order of said operands if this results in a smaller Hamming distance.

* * * * *